July 6, 1965 I. G. AKMENKALNS 3,193,691

DRIVER CIRCUIT

Filed Dec. 23, 1959

INVENTOR
IVARS G. AKMENKALNS
BY John P. Doarity
ATTORNEY 3,193,691
DRIVER CIRCUIT
Ivars G. Akmenkalns, Endicott, N.Y., assignor to International Business Machines Corporation, New York, N.Y., a corporation of New York
Filed Dec. 23, 1959, Ser. No. 861,622
1 Claim. (Cl. 307—88)

This invention relates to driver circuits and more particularly to driver circuits for driving loads that are subject to diminution in magnitude.

Magnetic cores are today extensively used as storage and switching elements in data processing and communication equipment. It is a well known fact that after a magnetic core is driven into saturation, the core as a load presents a very low impedance. This fact places rather severe requirements on a voltage switch type circuit employed to drive the magnetic core circuit. The requirement that a driver be capable of driving a load having substantial impedance and also of driving the load when its impedance has gone to a very low value dictates that a rather expensive driver be provided or that some provision be made so that the driver is not required to drive the low impedance. A driver that must drive both a high impedance load and an unproductive low impedance is not only initially expensive to build but is also expensive in its consumption of power, particularly when driving the low impedance. When using transistors as the amplifying means in driver circuits, a high impedance may be driven with a relatively inexpensive transistor amplifier. However, since transistors of the ordinary variety are not capable of handling high currents, the presentation to the transistor amplifier of a low impedance may cause such a large current to flow as will damage the transistor. This is true whether the characteristic of the load being driven by the amplifier varies from a relatively high impedance to a relatively low impedance or whether the conditions are such that the load through malfunction of some circuit component is shorted out. In either event, damage may result to the amplifier if some precaution is not taken to compensate for the low impedance presented to the driver. In the past, nonlinear elements have been placed in series with the load to prevent the presentation of a low impedance. Since these series elements generally come into play only after the useful driving function has been accomplished they are expensive in terms of using power that generates heat which must in some manner be dissipated.

An object of the present invention is to provide an improved driver circuit for driving a nonlinear load.

Another object of this invention is to provide an improved driver circuit for driving a saturable magnetic core load.

According to a preferred embodiment of the present invention, a transistor amplifier is provided to drive a saturable magnetic core. The output of the amplifier contains a second nonlinear impedance element whose impedance changes as the load is driven to saturation. The change in impedance of the second nonlinear element generates a signal which signal is fed back to the input of the driver amplifier to disable or deactivate the driver amplifier. In this manner, once the magnetic core load has been driven to saturation, the driving amplifier is turned off so that it no longer consumes power and so that the amplifier will not be damaged by excessive current. The nonlinear impedance element will also generate a signal in the event that the load is shorted out to turn off the amplifier.

Another object of this invention is to provide an improved driver circuit wherein the impedance of a load is sensed and fed back to control the operation of the driver.

Another object of this invention is to provide an improved driver circuit for driving a saturable magnetic core only so long as the saturable magnetic core presents a relatively high impedance to the driver circuit.

Another object of this invention is to provide a feedback means between the output of a magnetic core driving circuit and the input to the driving circuit for disabling the driving circuit once the magnetic core has been driven into saturation.

Another object of this invention is to provide means for sensing the loss of load on a driver circuit and to disable said driver circuit in response to sensing the loss of load.

Another object of this invention is to provide improved means for limiting the operation of a driver circuit to the period of time required to accomplish its desired driving function.

Still another object of this invention is to provide an improved circuit for driving a saturable magnetic core wherein the driver is operated only for the duration of time required to perform a desired driving function.

The foregoing and other objects, features and advantages of the invention will be apparent from the following more particular description of preferred embodiments of the invention, as illustrated in the accompanying drawings.

Figure 1:
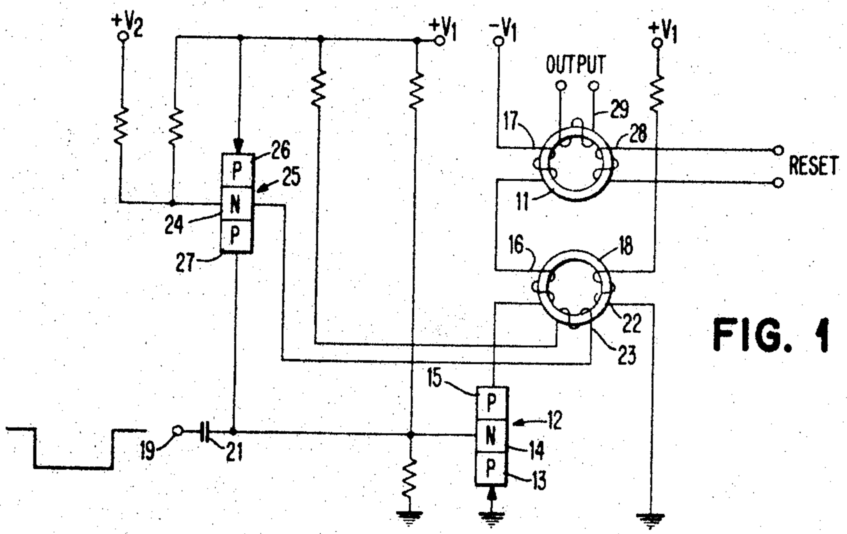
FIGURE 1 is a schematic diagram of a driver circuit constructed in accordance with the present invention.
Figure 2:
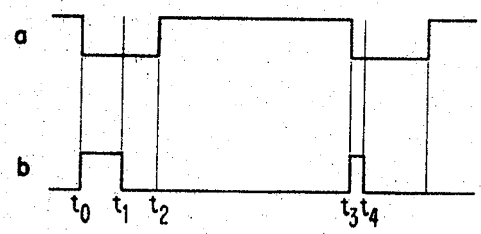
FIGURE 2 is a showing of diagrammatic wave forms to a common time base of signals appearing in portions of FIGURE 1.

Referring to FIGURE 1 a driver circuit constructed in accordance with the present invention is shown driving a saturable magnetic core load 11. The driver circuit includes a grounded emitter configuration transistor amplifier 12 having an emitter 13 connected to ground, a base 14 and a collector 15. The collector 15 is connected through windings 16 and 17 to a source of negative potential —V1. The windings 17 and 16 ar respectively on cores 11 and 18 and serve to drive these cores. Cores 11 and 18 each form a nonlinear impedance element. When it is desired to drive the magnetic core load 11 a negative-going signal, shown at *a* in FIGURE 2, is applied to a terminal 19 and through a capacitor 21 to the base 14 of a transistor amplifier 12. This negative-going signal applied to the base 14 enables or turns on the amplifier 12 to drive current through windings 16 and 17. Core 18 has a bias winding 22 thereon which biases the core 18 in a direction opposite the flux induced by the winding 16. Thus, more current is required from amplifier 12 to switch core 18 than is required to switch core 11. As the amplifier 12 is turned on, core 11 will switch and during the switching time of core 11 a relatively high impedance is presented to the output of amplifier 12. During the switching time of core 11, insufficient current is supplied through winding 16 to switch core 18. Thus, winding 16 and core 18 offer a low impedance to the flow of current through winding 17 while core 11 is switching. Once core 11 has switched, however, the core 11 and winding 17 offer a low impedance and the current through windings 16 and 17 will rise sufficiently to switch core 18. As core 18 is switched a signal is generated across winding 23 and fed to the base 24 of a second grounded emitter configuration transistor amplifier 25. Amplifier 25 has an emitter 26 connected to a source of positive potential +V1 and a collector 27 connected to the base or input of amplifier 12. The direction of the winding 23 on core 18 is such that the switching of core 18 induces a signal in winding 23 of a polarity to drive the base 24 of amplifier 25 in the negative direction and thus turn on amplifier 25. As amplifier 25 is turned on the collector 27 goes positive and supplies a positive signal to the base 14 of amplifier 12. This positive signal to the input of amplifier 12 cuts off amplifier 12 so that current is no longer supplied through windings 16 and 17. Once amplifier 12 is turned off, bias winding 22 will switch core 18 back to its initial condition of magnetization and thus make the nonlinear impedance element including core 18 ready for a next operation. If the core 11 is not reset by current through a reset winding 28, then core 11 will remain in a state of magnetization that will afford only a low impedance to current through winding 17. In such condition another signal, as shown at *a* in FIGURE 2, applied to terminal 19 and through condenser 21 to the base 14 of amplifier 12 will again turn amplifier 12 on. However, since the load now offers a low impedance by virtue of the fact that core 11 has not been reset, the current will rapidly rise in magnitude to the level required to switch core 18. Once core 18 starts to switch a signal is again applied to the base 24 of the amplifier 25 which in turn feeds a signal back to base 14 of the amplifier 12 to immediately turn amplifier 12 off. In this manner the amplifier 12 is not damaged by drawing an excessive current. It may also be seen that if the winding 17 on core 11 for some reason becomes shorted the circuit will operate in a like manner to immediately turn amplifier 12 off.

In the normal operation of the circuit, core 11 is reset by a signal through reset winding 28 prior to turning on amplifier 12.

The wave form shown at *a* in FIGURE 2 is a diagrammatic representation of the input signals to the terminal 19. The wave form shown at *b* in FIGURE 2 is a diagrammatic representation of the signals taken from the output at collector 15 of amplifier 12. It may be seen that the collector 15 is at a relatively high positive level between times *t*0 and *t*1 in the normal operation of the circuit. The time interval between *t*0 and *t*1 is the time required for core 11 to switch added to the time required for core 18 to switch and supply a signal back through amplifier 25 to amplifier 12 to turn amplifier 12 off. It may also be seen that the input signal to the amplifier 12 remains on until time *t*2. However, because of the feedback circuit between the output of amplifier 12 and its input, a loss of load is sensed and a signal is fed back to turn amplifier 12 off before the input signal dies away. The amplifier 12 remains on only for a portion of the period of the input signal. The period between *t*3 and *t*4 represents the time that amplifier 12 remains on in the absence of a load impedance. This period is less than the time between *t*0 and *t*1 by the time required to switch core 11. Thus, the nonlinear impedance element including core 18 senses the loss of load in the output of amplifier 12 and generates a signal in response thereto which signal is fed back to the input of amplifier 12 to turn amplifier 12 off to prevent damage to amplifier 12 and prevent the dissipation of energy after the useful driving function of amplifier 12 has been accomplished. This is accomplished by forcing the amplifier to remain in saturation while in the on state. An output may be taken from the core 11 over winding 29 as desired.

Figure 3:
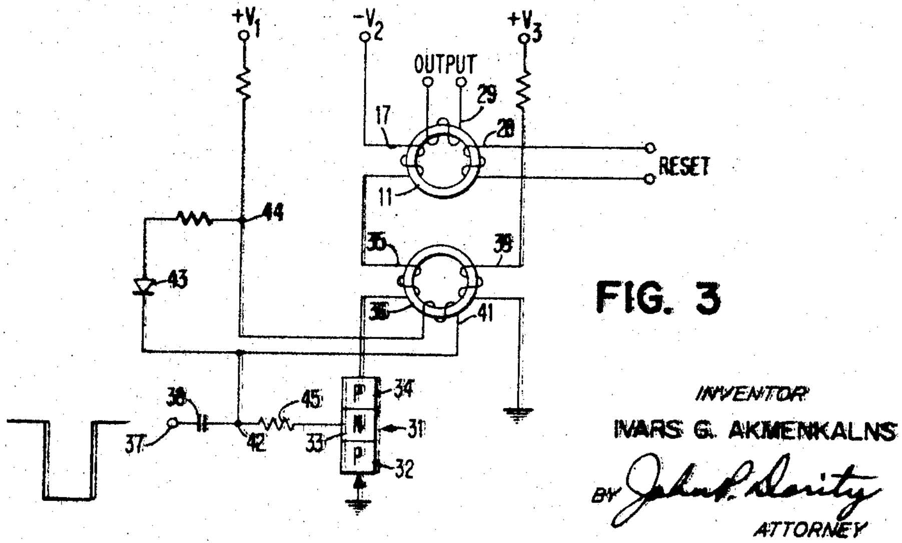
FIGURE 3 is an alternate form of a driver circuit constructed in accordance with the present invention.

Referring to FIGURE 3, a modified form of the driver circuit of FIGURE 1 is shown. A grounded emitter type transistor amplifier 31 is provided with an emitter 32, a base 33 and a collector 34. The collector 34 is connected through a winding 35 on a core 36 and through winding 17 on core 11 to a source of negative potential −V2. The core 11 and associated windings of FIGURE 3 corresponds exactly to the core 11 and associated windings of FIGURE 1 and their like reference numerals are used. A negative-going signal is supplied to the driver on terminal 37 and through condenser 38 to the base or input 33 of amplifier 31. This negative-going signal activates or turns on amplifier 31 to drive current through windings 17 and 35. The nonlinear impedance element including core 36 has a bias winding 39 thereon which serves the same function as the bias winding 22 in the embodiment of FIGURE 1. Again, as a loss of load occurs, the core 36 is switched and induces a signal in winding 41 which signal is fed back directly to the amplifier 31. The direction of the winding 41 is such that the output signal to the terminal 42 is positive in direction. The positive signal applied to terminal 42 raises the potential at the base 33 of amplifier 31 and turns amplifier 31 off. This positive signal is fed back to the terminal 42 after the core 11 has switched or in the event that the winding 17 is shorted out or in the event that the core 11 is not reset by reset winding 28. Diode 43 is provided in the circuit of winding 41 to enable terminal 44 to go positive with respect to the terminal 42 during the time the core 36 is reset by winding 39 without turning amplifier 31 back on. The provision of diode 43 enables the signal developed across winding 41 on resetting core 36 to be rapidly dissipated. Again, it may be seen that the amplifier 31 is cut off immediately after its useful driving function has been performed.

With the provision of a nonlinear impedance element and a feedback circuit to the input of the amplifier, a driver is provided that operates only during the period of the useful driving function. Such an arrangement is less demanding on the amplifier, prevents damage to the amplifier in the event of a malfunction of the load circuit and prevents the needless generation of heat by driving a load circuit after the useful driving function has been accomplished.

While the invention has been particularly shown and described with reference to preferred embodiments thereof, it will be understood by those skilled in the art that various changes in form and details may be made therein without departing from the spirit and scope of the invention.

What is claimed is:

A driver circuit comprising, in combination, first and second transistor amplifiers each having an input and an output, a first saturable magnetic core having an input winding, a reset winding and an output winding, a second magnetic core having an input winding, a feedback winding and a bias winding having a bias current flowing therethrough, said input windings of said cores being connected in series, the output of said first amplifier being serially connected to said input windings, means for receiving a first signal at the input of said first amplifier for activating said amplifier to develop a current for switching or shifting said first core from a first to a second magnetic state to provide a signal through its output winding, said input winding of said first core presenting a relatively high impedance to said first amplifier during the switching time of said core, the current in the biasing winding inhibiting said second core from shifting magnetic states during the switching time of sad first core, the impedance of said input winding of said first core decreasing after said first core shifts magnetic states to permit sufficient current to flow through said series input windings to cause said second core to shift magnetic states, said feedback winding developing a signal when said second core shifts, means connecting said feedback winding to the input of said second amplifier to cause the feedback signal to activate said second amplifier, means connecting the output of said second amplifier to the input of said first amplifer, said second amplifier when activated by said feedback signal providing a signal to deactivate said first amplifier, current through said bias winding resetting said second core when said first amplifier is deactivated, and said reset winding of said first core being energizeable to reset said first core.

References Cited by the Examiner

UNITED STATES PATENTS

| | | | |
|---|---|---|---|
| 2,772,370 | 11/56 | Bruce et al. | 307—88 |
| 2,774,878 | 12/56 | Jensen | 307—88 |
| 2,854,580 | 9/58 | Uchrin et al. | 307—88 |
| 2,874,293 | 2/59 | McMurren | 307—88 |
| 2,891,170 | 6/59 | Paull | 307—88 |
| 2,920,213 | 1/60 | Elias | 307—88.5 |
| 2,939,115 | 5/60 | Bobeck | 307—88.5 |
| 3,114,115 | 12/63 | Taunt | 307—88.5 X |

IRVING L. SRAGOW, *Primary Examiner.*